United States Patent [19]

Nakano et al.

[11] Patent Number: 4,803,405

[45] Date of Patent: Feb. 7, 1989

[54] PLASMA PROCESSING APPARATUS AND METHOD

[75] Inventors: Etsuo Nakano, Sakura; Akira Furujo, Funabashi; Tetsuya Iizuka, Tokyo, all of Japan

[73] Assignee: Koike Sanso Kogyo Co., Tokyo, Japan

[21] Appl. No.: 40,565

[22] Filed: Apr. 16, 1987

[30] Foreign Application Priority Data

Apr. 18, 1986 [JP] Japan .................................. 61-88076

[51] Int. Cl.[4] ................................................ B23K 9/00

[52] U.S. Cl. .......................... 315/111.21; 315/111.11; 315/358; 219/121.36; 313/231.41

[58] Field of Search ...................... 315/111.21, 111.31, 315/111.11, 111.81, 358; 313/231.31, 231.41; 219/75, 76.1, 76.11, 121 R, 121 PC, 121 PH, 121 PE, 121 PM, 121 PU, 121 PV, 121 PW

[56] References Cited

U.S. PATENT DOCUMENTS

| | | | |
|---|---|---|---|
| 3,949,266 | 4/1976 | Vogts et al. | 315/111.21 |
| 4,055,741 | 10/1977 | Bykhovsky et al. | 219/121 PC |
| 4,060,088 | 11/1977 | Morrison, Jr. et al. | 219/121 P |
| 4,107,507 | 8/1978 | Schultz et al. | 219/121 P |
| 4,250,373 | 2/1981 | Tanida | 219/121 P |
| 4,291,217 | 9/1981 | Braun | 219/121 PU |
| 4,341,941 | 7/1982 | Tateno | 219/121 PU |
| 4,386,258 | 5/1983 | Akashi et al. | 219/121 P |
| 4,663,515 | 5/1987 | Kneeland et al. | 219/121 PU |
| 4,663,567 | 5/1987 | Wong | 315/111.21 |

FOREIGN PATENT DOCUMENTS

| | | | |
|---|---|---|---|
| 0068270 | 4/1982 | Japan | 219/121 PU |

*Primary Examiner*—Leo H. Boudreau
*Assistant Examiner*—Mark R. Powell
*Attorney, Agent, or Firm*—Arnold S. Weintraub; Gerald R. Black

[57] ABSTRACT

The present invention relates to a plasma processing apparatus capable of obtaining a satisfactory plasma arc and a processing method used by this plasma processing apparatus.

The plasma processing apparatus is constructed to vary an electric current or a voltage during start up at a fixed period for a fixed time. The plasma processing apparatus has a plasma power source capable of controlling an electric current or a voltage applied to a plasma torch, and an electrode and a nozzle are communicated by means of an electrification in the plasma torch.

In a method for performing a plasma process by a plasma processing apparatus, a mixing gas has a ratio of Hydrogen to Argon in a range from 5 to 20 Vol %, and a frequency of a plasma electric current is controlled in a range from 10 to 30 KHz.

7 Claims, 2 Drawing Sheets

PLASMA PROCESSING APPARATUS AND METHOD

BACKGROUND OF THE INVENTION

1. Field of the Invention:

The present invention relates to a plasma processing apparatus capable of obtaining a satisfactory plasma arc, smoothly performing the start of the plasma processing with regard to plasma cutting or welding and the like, and a processing method used by this plasma processing apparatus.

2. Description of the Prior Art:

In order to stabilize the start of the plasma processing, hitherto required the use of a large quantity of gas flow, or a larger pressure than a fixed numerical value established by using a high electric current or a high voltage for an electrode of the plasma torch. Alternatively, the plasma processing was started while gas and electricity were controlled by arranging a wrap of a negative electrode between an electrode of the plasma torch and a nozzle. In the customary torch, there are problems. For examples, the life of the electrode and the nozzle are reduced remarkbly by the use of a high electric current or a high voltage, and when setting up a wrap of the negative electrode, the structure of the apparatus becomes complicated, the apparatus is prone to break downs, and the cost becomes expensive.

Also, when plasma processing is carried out by the customary plasma processing apparatus, several conditions may vary to some degree. These conditions include a plasma electric current, plasma gas electric current, a mixing ratio of the plasma gas, a bore of the jetting nozzle for the plasma arc use and the like. Varying conditions will result in a frequency of the plasma electric current varying, and consequently there are problems. For instance, when the plasma arc becomes unsteady, the length of the plasma arc may expand with alignment or retract, which has a bad affect on the processing.

SUMMARY OF THE INVENTION

The present invention relates to an entirely novel technique that fundamentally improves the above mentioned customary problems. More particularly, it relates to a plasma processing apparatus capable of producing high quality processing by obtaining a lengthy plasma arc constantly and controlling a frequency of the plasma electric current in the subsequent plasma processing, to maintain the frequency of the current within a definite range while stabilizing the start of the plasma processing, and a processing method used by the processing apparatus.

DETAILED DESCRIPTION OF THE PREFERRED EMBODIMENT

Figure 1:
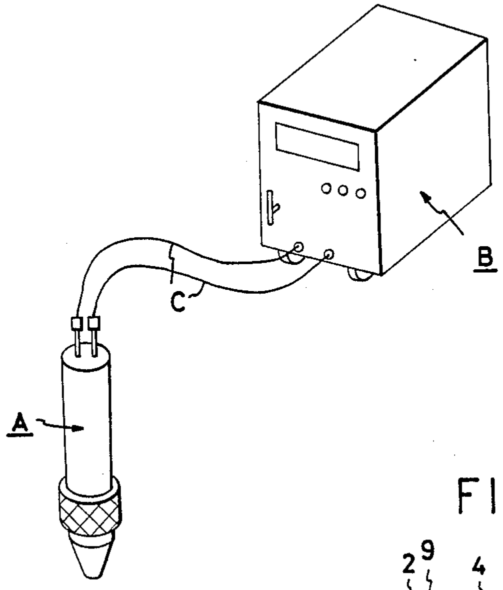
FIG. 1 is an external view of the plasma processing apparatus in accordance with the present invention.

Referring now to an embodiment of the plasma processing apparatus shown in FIG. 1, A designates a plasma torch and B designates a plasma power source. The torch A and the power source B are connected mutually by connectors C.

Figure 2:
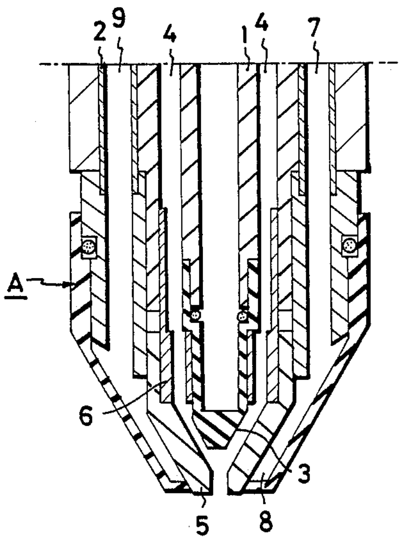
FIG. 2 is a cross-sectional view showing the principal part of the plasma torch in the plasma processing apparatus.

As shown in FIG. 2, in this torch A, a centrally located pipe 1 made of a good electric conductive material is connected with an electrode 3 at the tip of the torch. A good electric conductive pipe 2, insulated from pipe 1 by an insulator of nonconductive material, is connected with a nozzle 5, which is arranged around the above-mentioned electrode 3. A gas passage 4 is arranged between the pipe 1 and the pipe 2, and a plasma gas, which is supplied to this gas passage 4, passes through a gas rectifier 6, which is arranged at the tip of the passage 4. The plasma gas is emitted in to the atmosphere after passing between the electrode 3 and the nozzle 5.

A water-cooled chamber 8 is arranged around the nozzle 5. Cooling water is supplied from an entrance 7, and is able to flow out an exit 9 through this water-cooled chamber 8.

A plasma arc is generated between the electrode 3 and the nozzle 5 by turning on the power source B. The plasma gas, which is cooled by the nozzle 5, is concentrated on a center by the thermal pinch effect of welding arc. The plasma gas is emitted to the material to be processed through the nozzle 5, while the plasma gas is transformed into high speed plasma. It is possible to perform welding or cutting processing on the material to be processed using the plasma processing apparatus of the present invention.

Figure 3:
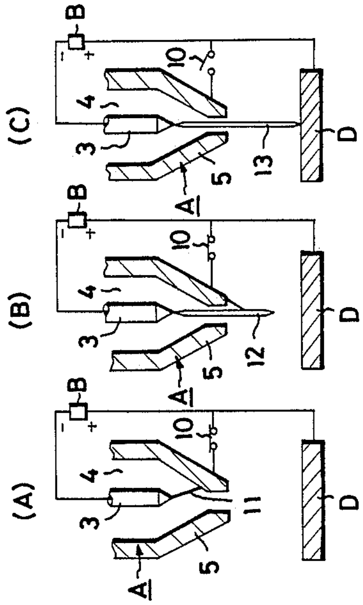
FIG. 3 including (A), (B), and (C) is an explanatory drawing showing a sequence for processing an electric conductive material.
Figure 5:
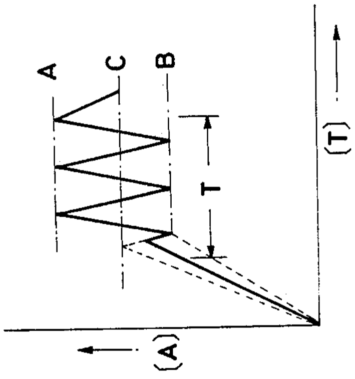
FIG. 5 is an explanatory drawing showing a control of the electric current while starting the plasma processing.
Figure 4:
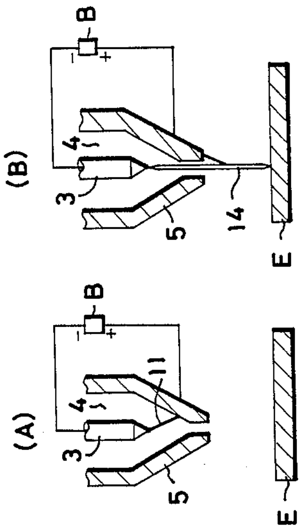
FIG. 4 including (A) and (B) is an explanatory drawing showing a sequence for processing a nonconductive material.

A starting method for plasma processing used by the above mentioned plasma torch A is explained in FIG. 3, FIG. 4 and FIG. 5. FIG. 3 including (A), (B) and (C) is a brief explanatory drawing of the plasma torch A indicating the starting state for processing an electric conductive material D, including metallic material and the like.

To cut the electric conductive material D, electricity is applied to the electrode 3 of the plasma torch A and to the electric conductive material D from the plasma power source B. Also, the nozzle 5 of the plasma torch A is able to be electrified by the plasma power source B through a switch 10.

Accordingly, the starting method in accordance with the present invention, first as shown in FIG. 3(A), includes flowing plasma gas through the gas passage 4, closing the switch 10, applying voltage between the electrode 3 and the nozzle 5 from the power source B, and generating a start arc 11. Secondly, immediately after this start arc is generated, it is possible to obtain the pilot arc 12 by firing at a stabilized state, as shown in FIG. 3(B). The power source B is controlled by means for varying an electric current or voltage between the electrode 3 and the nozzle 5 at an optional period for an optional time, as shown in FIG. 5.

Thereafter, as shown in FIG. 3 (C), after the switch 10 is opened and the nozzle 5 is electrically neutral, it is possible to cut the electric conductive material D at a stabilized state by emitting the plasma main arc 13 from the nozzle 5.

Next, the processing of nonconductive material E, including plastic, wood, paper, ceramics and the like, by the plasma are explained by FIG. 4 (A) and (B).

Nonconductive materials E are processed by the plasma in a similar manner to the processing of the electric conductive materials D. The plasma gas flows through the gas passage 4, and voltage is applied between the electrode 3 and the nozzle 5 from the power source B. The start arc 11 is generated between the electrode 3 and the nozzle 5. Immediately after generation, the plasma jet 14, as shown in FIG. 4 (B), is obtained at a stabilized state by controlling the power source B with means for varying an electric current or voltage at an optional period for an optional time, as shown in FIG. 5. It is possible to process nonconductive material E at a stabilized state by this plasma jet 14.

Furthermore, variation of an electric current between the electrode 3 and the nozzle 5, and control of the electric current in regard to the time while starting the plasma processing, are performed in accordance with the following.

In the drawing of FIG. 5, the initial electric current is increased until it reaches a range between a set operating electric current C (preferably 17 amperes) and a set lower limit electric current B (15 amperes) having a lower amplitude. The electric current is then varied in between a range from a set upper limit electric current A (20 amperes) to the set lower electric current B at a period of Ntimes and for an optional time T (0.5 seconds) Thereafter, the pilot arc is fired at a stabilized state by bringing the electric current back to the set operating electric current C, and successively it is possible to certainly obtain the plasma main arc 13 or the plasma jet 14.

In the present invention, after the start of the plasma processing is completed as mentioned above, while the plasma gas, the plasma electric current and the frequency of the plasma power source are established in the conditions as indicated in the following respectively, it is possible to obtain a very stabilized, satisfactory and lengthy plasma arc.

That is to say when an experiment was conducted varying the frequency (Hz) of the plasma power source within the range of 10 to 30 KHz, while the plasma was a mixed gas including Argon (Ar: atomic number 18) and Hydrogen (H: atomic number 1) with a mixing ratio of Argon and Hydrogen of 87:13, and with the plasma electric current established in the range from 0.1 ampere to 40 amperes, a flux of the plasma gas at 60 l/H (liters per hour) and a nozzle bore of 0.5 mm, it was possible to obtain a generally stabilized and lengthy plasma arc within this range. Particularly, it was possible to obtain the longest arc at the time when the frequency of the plasma electric current was 15 KHz.

Furthermore, experiments were performed varying the ratio of Hydrogen and Argon diversely, and it was ascertained that a 5-20 Vol% ratio is very effective.

Namely, when the ratio of Hydrogen to Argon is 5-20 Vol%, Hydrogen gas emitted from the nozzle burns over many hours in the air, and consequently it is possible to obtain a lengthy plasma arc having a high temperature.

When the ratio of Hydrogen is larger than the above-mentioned range, there are problems with the electrode and the nozzle being consumed remarkably by the increase in temperature. On the other hand, it was confirmed experimentally that the effect is lacking when the ratio of Hydrogen is small.

When a plastic board having a 20 mm thickness is cut by the above-mentioned conditions, a cut having a very high quality is possible.

In the present invention, the plasma processing is started while an electric current or voltage is varied optionally at the starting time of the plasma processing. This makes it possible to perform a stabilized start of the plasma processing.

Besides, after the start of the plasma processing, since the plasma gas, the plasma electric current and the frequency of the plasma power source are established in the specific condition and range respectively, it is possible to obtain a very stabilized, satisfactory and lengthy plasma arc, and consequently, it is possible to carry out the plasma processing with good accuracy.

What is claimed is:

1. A method for operating a plasma processing apparatus comprising the steps of:
   - first, generating a dc starting arc between an electrode and a nozzle of a dc plasma torch to ignite the torch, the torch having a primary gas and a secondary gas;
   - second, increasing the dc arc current above a predetermined non zero lower limit; and
   - thereafter, varying the dc arc current between the electrode and nozzle at a fixed period for a fixed time between said lower limit and an upper limit to start the plasma process.

2. The method of claim 1, wherein the primary gas is argon, the secondary gas is hydrogen, and a ratio of hydrogen to argon is in the range of 5 to 20 volume percent.

3. The method of claim 1, further comprising:
   - controlling a frequency of a plasma electric current in a range of 10 to 30 KHz.

4. A plasma processing system comprising:
   - a dc plasma torch having a nozzle electrode, a central electrode, and means for introducing at least one gas therebetween; and
   - means for generating an initial arc between said central electrode and said nozzle electrode from a d.c. power supply, to ignite said at least one gas;
   - means for increasing the d.c. current associated with said arc to a predetermined upper limit; and
   - means for periodically varying said d.c. current between a predetermined non zero lower limit and said upper limit for a fixed number of periods, whereby stabilized starting is facilitated.

5. A method of starting a plasma processing system, which system comprises a dc plasma torch having a nozzle electrode, a central electrode, and means for introducing at least one gas therebetween, the method comprising the steps of:
   - generating an initial arc between said central electrode and said nozzle electrode from a d.c. power supply, to ignite said at least one gas;
   - increasing the d.c. current associated with said arc to a predetermined upper limit; and
   - periodically varying said d.c. current between a predetermined non zero lower limit and said upper limit for a fixed number of periods, whereby stabilized starting is facilitated.

6. The method of claim 5, wherein the periodic variation of the dc current occurs at a frequency between 10 kHz and 30 kHz.

7. The method of claim 5, wherein the electric arc current varies in a range between about 15 amperes and about 20 amperes.

* * * * *